(12) United States Patent
Comalander

(10) Patent No.: US 11,578,821 B2
(45) Date of Patent: Feb. 14, 2023

(54) PIPE SUPPORT SYSTEM, AND METHOD OF USE

(71) Applicant: Comalander Fabrication and Services, LLC, Beaumont, TX (US)

(72) Inventor: Christopher R. Comalander, Beaumont, TX (US)

(73) Assignee: Comalander Fabrication and Services, LLC, Beaumont, TX (US)

( * ) Notice: Subject to any disclaimer, the term of this patent is extended or adjusted under 35 U.S.C. 154(b) by 82 days.

(21) Appl. No.: 17/035,487

(22) Filed: Sep. 28, 2020

(65) Prior Publication Data
US 2021/0010616 A1 Jan. 14, 2021

Related U.S. Application Data

(63) Continuation-in-part of application No. 16/388,328, filed on Apr. 18, 2019, now abandoned.

(60) Provisional application No. 62/695,975, filed on Jul. 10, 2018, provisional application No. 62/780,977, filed on Dec. 18, 2018.

(51) Int. Cl.
*F16L 3/16* (2006.01)

(52) U.S. Cl.
CPC ...................................... *F16L 3/16* (2013.01)

(58) Field of Classification Search
CPC ... F16L 3/1058; F16L 3/16; F16L 3/18; F16L 3/20; F16L 3/215; B25B 5/02; B25B 5/04; B25B 5/102; B25B 5/109
See application file for complete search history.

(56) References Cited

U.S. PATENT DOCUMENTS

| 1,097,273 | A | | 5/1914 | Tyler |
| 1,870,760 | A | | 8/1932 | Tipton |
| 2,500,204 | A | | 3/1950 | Ronay |
| 2,893,669 | A | | 7/1959 | Kindorf |
| 3,091,348 | A | * | 5/1963 | Neuhauser ............. B65D 71/70 |
| | | | | 206/391 |
| 3,397,564 | A | | 8/1968 | Schroeder |
| 3,769,190 | A | | 10/1973 | Deem, Jr. |
| 3,926,422 | A | | 12/1975 | Wilson |
| 5,028,149 | A | | 7/1991 | Hardtke |
| 5,072,901 | A | | 12/1991 | Scott |
| 5,163,642 | A | | 11/1992 | Torrens et al. |
| 5,689,862 | A | | 11/1997 | Hayes et al. |

(Continued)

OTHER PUBLICATIONS

Screen Shot of Grainger Pipe Support Block; Accessed Mar. 2019; https://www.grainger.com/product/15E509?cm_sp=Product_Details-_-Products_Based_on_Your_Search-_-IDPPLARECS&cm_vc=IDPPLARECS.

(Continued)

*Primary Examiner* — Jonathan Liu
*Assistant Examiner* — Guang H Guan
(74) *Attorney, Agent, or Firm* — Peter L. Brewer; Thrive IP

(57) ABSTRACT

A pipe support system. The pipe support system comprises a first wedge block and a second opposing wedge block. Each of the wedge blocks comprises a base having walls, and forming an angled top surface. The angled top surfaces face one another and support respective replaceable caps. The caps are configured to support a joint or section of pipe along an outer diameter of the pipe. Beneficially, the distance or spacing between the wedge blocks may be adjusted by an operator to accommodate sections of pipe having different diameters. A method for supporting a section of pipe is also provided.

24 Claims, 8 Drawing Sheets

(56) References Cited

U.S. PATENT DOCUMENTS

| | | | |
|---|---|---|---|
| 5,884,885 A * | 3/1999 | Schmidt, Jr. | B63B 23/62 |
| | | | 114/259 |
| 5,934,626 A | 8/1999 | Collins, Jr. | |
| 6,349,929 B1 * | 2/2002 | Speltz | B25B 1/2489 |
| | | | 269/224 |
| 6,592,093 B2 | 7/2003 | Valentz | |
| 6,703,851 B1 | 3/2004 | Howell | |
| 6,863,248 B2 * | 3/2005 | Calais | F16L 3/02 |
| | | | 248/70 |
| 7,090,173 B2 | 8/2006 | Lussier | |
| 8,807,492 B2 | 8/2014 | Lake | |
| 9,447,900 B2 | 9/2016 | Birch et al. | |
| 9,546,745 B2 | 1/2017 | Costa | |
| 9,644,767 B2 | 5/2017 | Schutte | |
| 9,726,303 B1 | 8/2017 | Gretz | |
| 9,744,634 B2 | 8/2017 | Plank | |
| 10,221,968 B2 | 3/2019 | Haynes et al. | |
| 10,247,330 B2 | 4/2019 | Hargrave | |
| 10,274,111 B2 | 4/2019 | Breda | |
| 10,279,437 B2 | 5/2019 | Velez | |
| 10,549,676 B2 * | 2/2020 | Sauer | B60P 7/0892 |
| D883,774 S | 5/2020 | Comalander | |
| 10,724,656 B2 * | 7/2020 | Comalander | B65G 1/0442 |
| D939,331 S * | 12/2021 | Comalander | B65D 71/70 |
| | | | D8/380 |
| 2006/0115189 A1 | 6/2006 | Koch | |
| 2015/0097098 A1 * | 4/2015 | Chi | B65D 85/66 |
| | | | 248/346.5 |
| 2018/0112802 A1 | 4/2018 | Guerra | |
| 2018/0277285 A1 | 9/2018 | Stilwell et al. | |
| 2020/0018424 A1 | 1/2020 | Comalander | |
| 2020/0018428 A1 | 1/2020 | Comalander | |
| 2020/0263810 A1 * | 8/2020 | Comalander | B23K 37/0533 |
| 2020/0332922 A1 * | 10/2020 | Comalander | F16K 27/00 |
| 2021/0010616 A1 * | 1/2021 | Comalander | F16L 3/18 |
| 2021/0293357 A1 * | 9/2021 | Comalander | F16L 3/01 |

OTHER PUBLICATIONS

Screen Shot of Ancorage Group Pipe Cradle; Accessed Mar. 2019; https://zipleaf.auz.net/Companies/Anchorage-Group-Pipe-Supports/Article-Piping-Cradles.

Screen Shot of EZ Line Pipe Clamp Shim Block Assy; Accessed Mar. 2019; http://www.ezline.com/ezline-pipe-clamps-and-shim-block-assemblies/.

Screen Shot of Precision Weld and Fabrication Shim Blocks; Accessed Mar. 2019; http://weweld.com/pipe-clamps/.

Screen Shot of PPSC Shim Block with Strap; Accessed Mar. 2019; https://www.pipelinepsc.com/gsh-shim-block-with-strap.

Screen Shot of Refurbished 5-Ton, 4-48" Od Pipe Roller Supports; Accessed May 2019; Date of publication unknown; https://www.ljwelding.com.

Screen Shot of Pipe Roll Stand; Accessed May 2019; Date of publication unknown; https://www.zoro.com.

Non-Final Office Action in related U.S. Appl. No. 16/388,328; dated Jun. 6, 2020; 38 pages.

Wood, WCL-1-T Anti-vibration ThermaGlide Axial-Slide Wedge Clamp, Feb. 19, 2018, http://www.betamachinery.com/products/anti-vibration-wedge-clamps/. (Year: 2018).

* cited by examiner

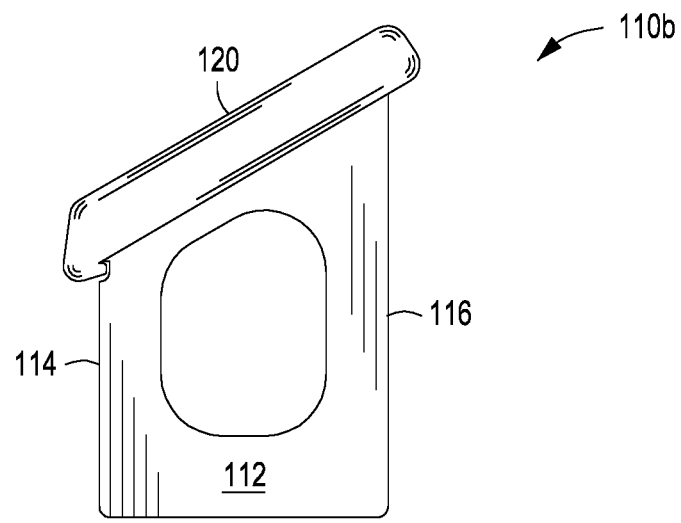
FIG. 4A
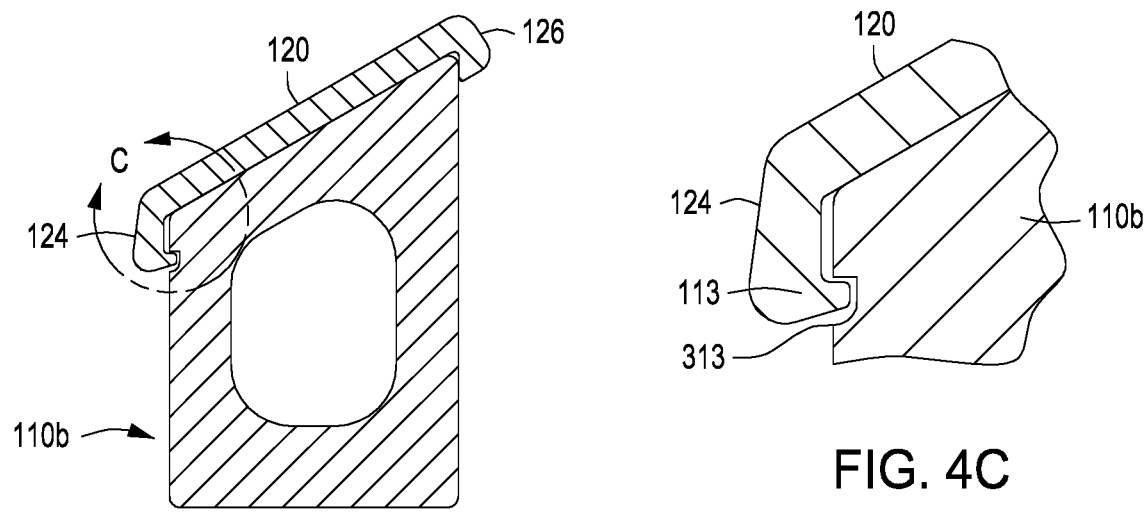
FIG. 4B
FIG. 4C

PIPE SUPPORT SYSTEM, AND METHOD OF USE

CROSS REFERENCE TO RELATED APPLICATIONS

This application is filed as a Continuation-in-Part of U.S. Ser. No. 16/388,328 filed Apr. 18, 2019. That application is entitled "Pipe Support System and Method of Use."

The parent application claimed the benefit of U.S. Ser. No. 62/695,975 filed Jul. 10, 2018. That application is also entitled "Pipe Support System and Method of Use."

The parent application also claimed the benefit of U.S. Ser. No. 62/780,977 filed Dec. 18, 2018. That application is also entitled "Pipe Support System and Method of Use."

Each of these applications is incorporated herein in its entirety by reference.

STATEMENT REGARDING FEDERALLY SPONSORED RESEARCH OR DEVELOPMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present invention relates generally to pipe support structures for holding joints of pipe or sections of pipeline above a ground surface. More specifically, the invention relates to a pipe support system that is adjustable so as to accommodate pipe joints having varied outer diameters.

Technology in the Field of the Invention

Pipeline transport involves the transportation of fluids. Such fluids may include brine, potable water or sewage. Such fluids may also include liquid hydrocarbons, hydrocarbons in gaseous state, refined hydrocarbons, or components separated from produced hydrocarbons such as sulfuric components and carbon dioxide.

Pipelines are made up of a series of pipe joints connected end-to-end. In many cases, pipelines are installed above ground. Such elevated pipelines are frequently supported by a series of stanchions (also known as pipe support stands) that are spaced apart along a length of the pipeline. These stanchions rise from the ground to support the pipeline a predetermined distance above the ground.

During use, the pipe joints along a pipeline will experience fluctuations in temperature. This is due to a combination of changes in ambient outdoor temperature and changes in the temperature of the fluids being transported. Temperature fluctuations will inevitably cause portions of the pipeline to expand and contract. Some temperature fluctuations will occur abruptly, for example, over a matter of hours. This may occur due to short term changes in weather or due to the 24-hour solar cycle. Other changes may occur over longer periods of time, for example, due to changes in season or changes in fluid composition.

As a practical matter, the temperature fluctuations experienced along a pipeline are non-uniform across the length of the pipeline. This leads to a situation where some portions of the pipeline will expand or contract axially to a greater degree than other portions. This, in turn, causes frictional wear as the pipeline rubs against the pipe support structure.

Pipeline stanchions may incorporate bearing surfaces that permit the overlying pipeline to slide relative to the stanchion. Beneficially, this can reduce the occurrence of bending, buckling, and jumping caused by an expanding or contracting pipe. For example, a pair of aluminum or polished stainless steel plates may be welded to the bottom of a pipe shoe and the top of a pipe stanchion, to face one another during use and to permit 360 degrees of relative movement as well as axial movement between the stanchion and pipeline. In other examples, one of the plates may be replaced with or ceramic or a polytetrafluoroethylene (PTFE) plate.

In any instance, it is necessary to monitor the condition of pipe support structures to ensure that the bearing surfaces are in good condition. Unfortunately, replacing bearing plates is time consuming and expensive. Further, each pipeline will require unique bearing plates, depending on pipe size. In this respect, one of the problems commonly associated with pipe support structures is that each set of supports is typically made for a specifically sized pipe, thereby limiting use.

Therefore, a need exists for an improved pipe support system for holding a pipe above a ground surface, wherein the bearing plate can be easily installed, and then later be easily removed and replaced. A need further exists for a pipe support system that may be adjusted so as to accommodate pipe joints or sections of a pipeline having varied outer diameters. Still further, a need exists for a pipe support structure that allows for longitudinal movement of the pipe once it is set onto the pipe support structure, but at low cost. Finally, a need exists for bearing plates that are configured to gravitationally wick away water.

BRIEF SUMMARY OF THE INVENTION

A pipe support system is first provided herein. In one aspect, the pipe support system comprises a first wedge block and a second wedge block. Each of the first and second wedge blocks comprises a base. Each base has an inside wall and an outside wall, wherein the outside wall is taller than the inside wall.

Each of the first and second wedge blocks also has an angled top surface. The angled top surface extends from the outside wall to the inside wall. The angled top surfaces face each other and are configured to support a joint or section of pipe along an outer diameter of the pipe. Preferably, the top surface of each of the first and second wedge blocks is at an angle of between 20° and 40° relative to a surface on which the first wedge block and the second wedge block sit. More preferably, the angle of each top surface is about 30°, creating a tangent line at the pipe surface.

Each of the first and second wedge blocks also includes at least one through-opening. The through-openings extend through each of the inside wall and the outside wall, with the respective through-openings being aligned.

In addition, the pipe support system includes at least one threaded bar. Each threaded bar is configured to extend through the aligned through-openings in each of the first wedge block and the second wedge block. The pipe support system is configured such that a rotation of the threaded bars in a first direction will draw the first and second wedge blocks inward towards each other, while rotation of the threaded bar in a second opposite direction will allow the first and second wedge blocks to be moved outward from each other.

Preferably, the at least one threaded bar comprises two threaded bars placed in parallel relation. In this instance, the aligned through-openings along the inside and outside walls of each of the first and second wedge blocks comprise:
  first aligned through-openings disposed proximate a first end of the respective wedge blocks, and
  second aligned through-openings disposed proximate a second end of the respective wedge blocks such that the two bars are spaced-apart.

In one embodiment, the pipe support system further comprises:
  a first nut threadedly secured onto a first end of each of the at least one threaded bar; and
  a second nut threadedly secured over a second opposite end of each of the at least one threaded bar.

In this instance, each of the first nut and the second nut may be adjusted to abut an outer surface of the outside wall of a respective wedge block. Note that "rotating" the threaded bars may comprise relative rotation between the threaded bars and their respective nuts.

In another embodiment, the through-openings of the bases in the respective wedge blocks comprise threads. The threads in the through-openings mate with threads along the threaded bars. In this way, nuts are not required for holding the first and second wedge blocks in place under a pipe joint or section of pipe.

In one aspect, the pipe support system further comprises a cap. Specifically, a cap resides on the angled top surface of each of the first and second wedge blocks. In this instance, each of the caps comprises corrugations arranged to gravitationally wick away water. This prevents water from building up along the outer diameter of the pipe, which could cause corrosion. Preferably, the corrugations on each cap are oriented transverse to the major axis of the cap.

In a preferred embodiment, each of the corrugated caps comprises:
  a first side configured to land on a top of an outside wall of a wedge block;
  a shoulder along the first side configured to wrap over the top of the outside wall of the wedge block;
  a second side configured to land on a top of an inside wall of the wedge block; and
  a shoulder along the second side configured to wrap over the top of the inside wall of the wedge block.

In one aspect, the corrugated caps are the angled top surfaces of the wedge blocks. In another aspect, the corrugated caps fit onto the base over the angled top surfaces, and are removable.

An outer surface of the inside wall of each wedge block may comprise a notch. Reciprocally, the shoulder along the second side of the corrugated cap comprises a lip that is dimensioned to snap-lock into the notch. This permits the caps to be quickly snap-locked into place. This also permits removal and replacement of the corrugated caps after a period of wear.

The pipe support system may further include a base plate. The base plate has opposing parallel sides, or edges. In this embodiment, the base of each of the first and second wedge blocks may comprise a first end and an opposing second end. The first and the second opposing ends are configured to straddle the opposing parallel edges of the base plate. In this way, the wedge blocks are laterally secured or stabilized as the first and second wedge blocks are moved inwardly and/or outwardly in response to rotation of the threaded bars. More importantly, the wedge blocks are stabilized during periods of thermal expansion/contraction of a supported pipe.

A method of supporting a section of pipe is also provided herein. In one embodiment, the method first comprises providing a pipe support system. The pipe support system may be in accordance with the pipe support system described above in its various embodiments. For example, the pipe support system may include:
  a first wedge block and a second wedge block, wherein each of the first and second wedge blocks comprises a base and an angled top surface,
  at least one through-opening through each of the first and second wedge blocks, wherein the respective through-openings are aligned, and
  at least one threaded bar configured to extend through aligned through-openings in each of the first wedge block and the second wedge block.

The method also includes determining a spacing between the first wedge block and the second wedge block in order to support a joint or section of pipe having a determined outer diameter. The method then includes rotating each of the threaded bars in order to provide for the determined spacing.

In a preferred arrangement, each of the threaded bars may be rotated in a first direction to draw the first and second wedge blocks inward towards each other. To accomplish this, an outside nut may be used at an end of each threaded bar, with the nuts abutting the outside wall of a wedge block. Reciprocally, each of the threaded bars may be rotated in a second opposite direction to allow the first and second wedge blocks to be moved outward from each other. To accomplish this, an inside nut may optionally be used along each threaded bar, with the nuts abutting the inside wall of a respective wedge block.

The method further comprises placing the joint or section of pipe onto the pipe support system. In this way the pipe is supported above a ground surface.

DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 4A is an end view of one of the wedge blocks of FIG. 1B, in one embodiment.

FIG. 4B is a cross-sectional view of the wedge block of FIG. 4A.

FIG. 4C is an enlarged view of portion "C" of FIG. 4B, show an interlocking relation between the corrugated cap and an upper inside surface of the wedge block.

DETAILED DESCRIPTION OF SELECTED SPECIFIC EMBODIMENTS

Figure 1A:
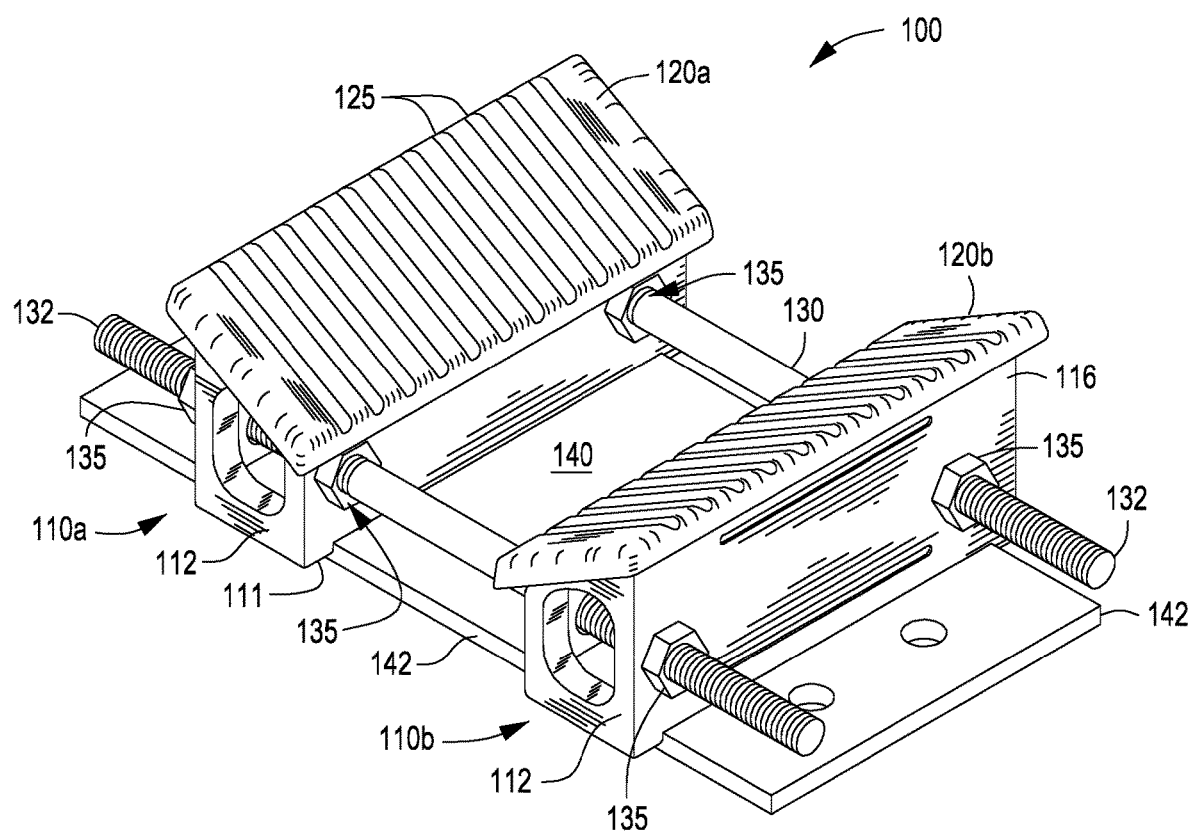
FIG. 1A is a perspective view of the pipe support system of the present invention, in one embodiment.
Figure 1B:
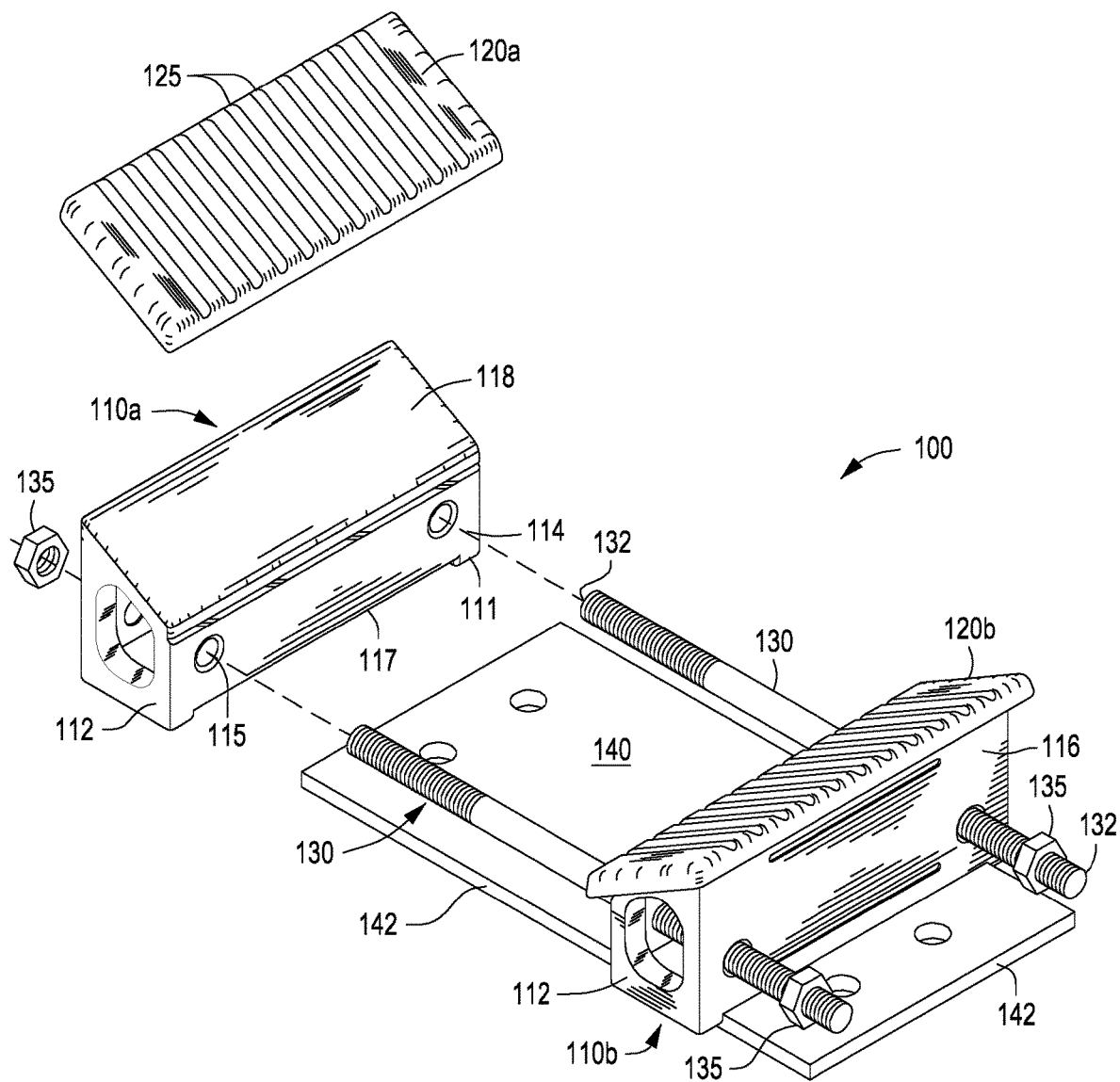
FIG. 1B is another perspective view of the pipe support system. Here, parts of the pipe support system are shown in exploded-apart relation.

The novel features characteristic of the embodiments of the present application are set forth in the appended claims. However, the embodiments themselves and further objectives and advantages thereof, will best be understood by reference to the following detailed description when read in conjunction with the accompanying drawings, wherein:

FIG. 1A is a perspective view of the pipe support system 100 of the present invention, in one embodiment. FIG. 1B is another perspective view of the pipe support system 100. Here, parts of the pipe support system 100 are shown in exploded-apart relation for illustrative purposes. The pipe support system 100 will be generally described with reference to FIGS. 1A and 1B together.

The pipe support system 100 first includes a pair of wedge blocks. These are denoted as a first wedge block 110a and a second wedge block 110b. Each wedge block 110a, 110b has an inside wall 114 and an outside wall 116. In addition, each wedge block 110a, 110b has an angled top surface 118. The top surfaces 118 slope inwardly from a top of the outside wall 116 to a top of the inside wall 114.

The wedge blocks 110a, 110b also offer end walls 112. Together, the end walls 112, the inside walls 114 and the outside walls 116 form a polygonal base for each of the respective wedge blocks 110a, 110b.

In the arrangement of FIGS. 1A and 1B, the wedge blocks 110a, 110b are hollow bodies. This is beneficial in that less material is required for fabrication. However, it is understood that each base may alternatively be a substantially solid block.

In a preferred arrangement, the wedge blocks 110a, 110b are fabricated from a metal such as ductile iron. Alternatively, a cementitious or hardened polycarbonate material may be used. In the event technology so develops, wedge blocks may be formed through an additive manufacturing process.

The wedge blocks 110a, 110b each offer aligned through-openings 115. For each wedge block 110, a through-opening 115 is provided in the inside (or "front") wall 114 and in the outside (or "back") wall 116. Preferably, each wedge block 110a, 110b offers two pairs of aligned through-openings 115. This is true whether the base is hollow or is otherwise solid.

Figure 3A:
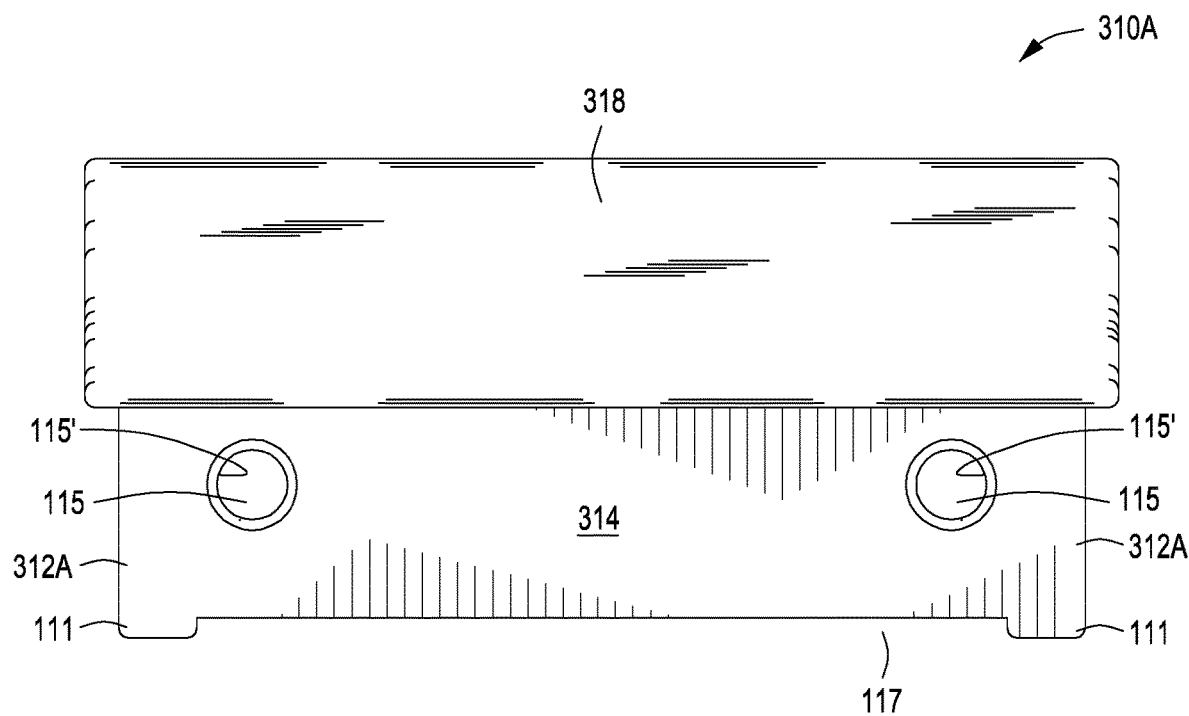
FIG. 3A is a front view of a wedge block as may be used in connection with the pipe support system of FIGS. 1A and 1B. In this view, a corrugated cap is not employed on the wedge block.
Figure 3B:
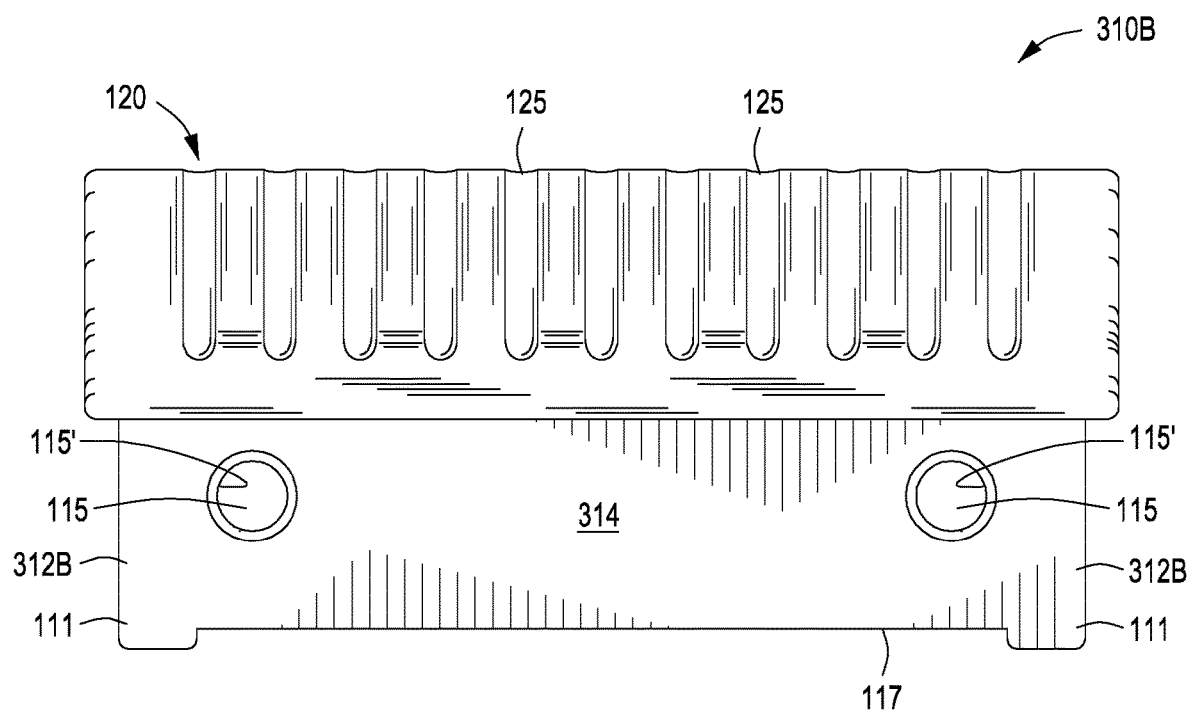
FIG. 3B is another front view of one of the two wedge blocks of FIGS. 1A and 1B. Here, a corrugated cap is placed on the wedge block, facilitating the movement of water or moisture away from a pipe.

In one aspect, each through-opening 115 includes threads (shown at 115' in FIG. 3B). The threads 115' mate or engage with threads 132 along threaded bars 130. In this way, rotation of the bars 130 will cause the respective wedge blocks 110a, 110b to be drawn inwardly towards each other or to move apart from each other, depending on a direction of rotation and whether the threads are left-hand turn or right-hand turn threads.

Figure 2:
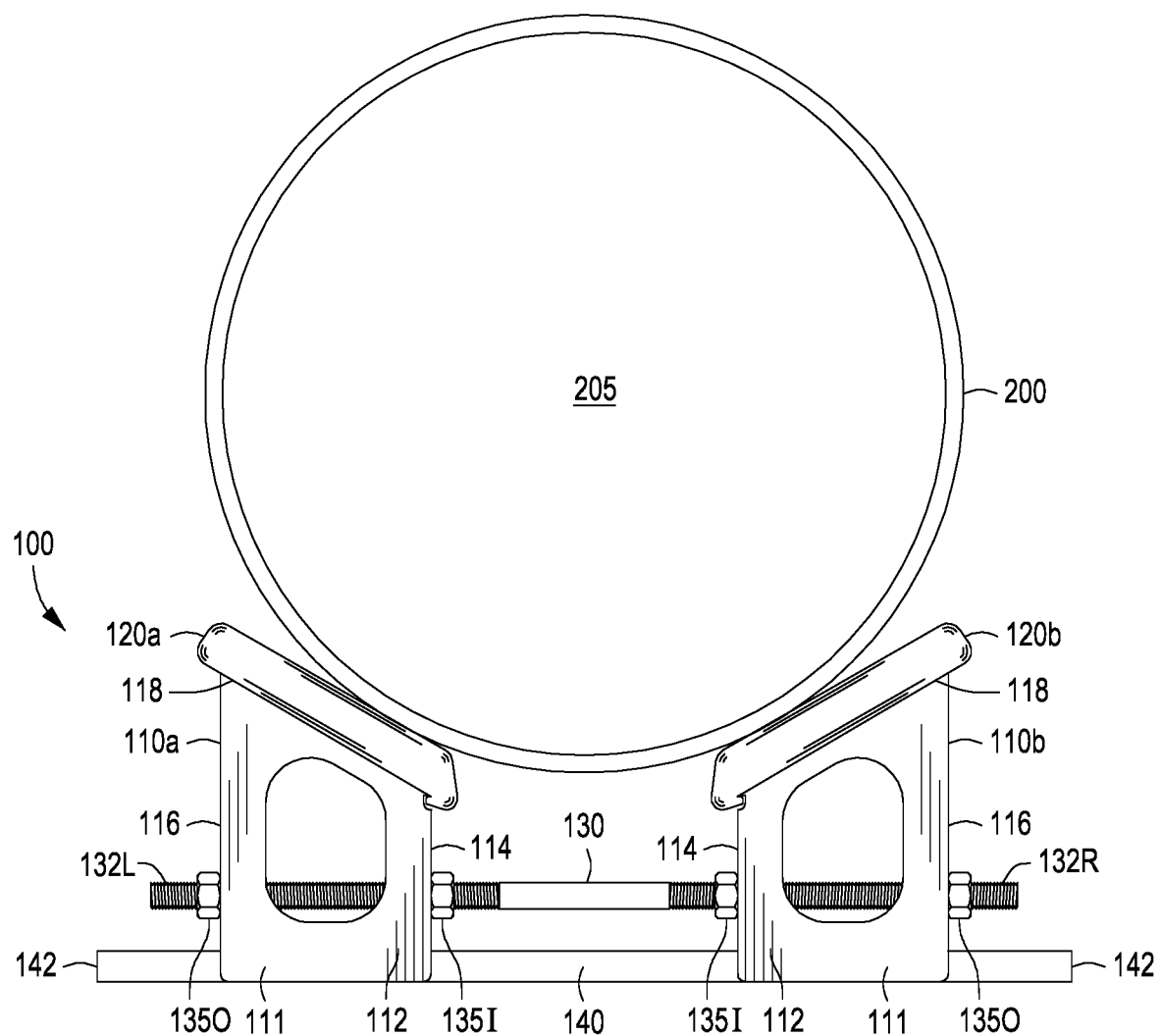
FIG. 2 is a side view of the pipe support system of FIG. 1A. Note that threads having opposite helices are placed along the threaded bar.

A person of ordinary skill in the art will understand that to arrange for this push-pull relationship between the wedge blocks 110a, 110b, the threads 132 may need to have opposite thread-hands from each other. FIG. 2 (discussed further below) shows threads 132L on one end, and threads 132R on the other end. The threads are applied with opposite "helices."

In one embodiment, the bars 130 simply slide through the through-openings 115. To accommodate the push-pull arrangement, nuts 135 are provided along the bars 130. The nuts 135 are rotated away from the opposing inside 114 and outside 116 walls of the respective wedge blocks 110a, 110b. Each of the one or more threaded bars 130 is then rotated in either a clockwise direction or in a counter-clockwise direction, simultaneously. This will serve to either draw the wedge blocks 110a, 110b together (i.e., inwardly) or push the wedge blocks 110a, 110b apart (i.e., outwardly).

To pull the wedge blocks 110a, 110b together, the operator may turn the inside nuts 135I to provide space relative to the inside walls 114. The outside nuts 135O are then rotated simultaneously while the bars 130 are held in place. This moves the wedge blocks 110a, 110b inwardly. The inside nuts 135I may then be tightened back down onto the inside walls 114 and the wedge blocks 110a, 110b are held in place.

To push the wedge blocks 110a, 110b apart, the operator may turn the outside nuts 135O to provide space relative to the outside walls 116. The inside nuts 135I are then rotated while the bars 130 are held in place, to move the wedge blocks 110a, 110b outwardly. The outside nuts 135O may then be tightened back down onto the outside walls 116.

It is understood that patent drawings do not need to be presented at "spec level" and the threads 132L, 132R may be considered schematically (i.e., showing helices in the same direction or in opposite directions) and yet function to provide the push-pull relationship as set forth in the claims. For example, the helices may be presented in the same direction (as set forth in FIG. 2 of the parent application, incorporated herein by reference), and still meet the written description requirement. This would require rotating nuts 135O and 135I on the left, that is, adjacent threaded end 132L, while holding the bar 130 still. In this way, the wedge block 110a may be moved relative to wedge block 110b. The orientation of the threads is not material.

The pipe support system 100 also preferably includes a cap 120. Each cap 120 is designed to snap-fit onto the angled top surface 118 (as discussed in further detail below). Each cap 120 is fabricated from a polycarbonate material, polyurethane or a synthetic thermoplastic linear polyamide (or nylon). Nylon is preferred as it offers a combination of high strength and relatively low friction. One suitable example of a nylon material is Nylatron® GSM, available from Quadrant EPP USA Inc. of Reading, Pa. Nylatron® GSM contains finely divided particles of molybdenum disulphide ($MoS_2$) to enhance load bearing capabilities while maintaining the impact resistance inherent to nylon. Other Nylatron® products may also be considered. However, it is preferred that whatever plastic or other material is used, it should preferably have UV stabilizers and be non-conductive.

It is noted that the caps 120 each include a plurality of channels 125. The channels 125 are configured to permit water to flow under a pipe and then off of the wedge blocks 110. This prevents corrosion of the pipe due to water build-up on the wedge blocks 110, such as may be caused by rain. For this reason, the caps 120 may be referred to as corrugated caps.

The channels 125 of the caps 120 may be of any design so long as they facilitate the gravitational wicking away of water. Preferably, the channels 125 are oriented transverse to a longitudinal axis of the angled cap 120.

It is observed that the caps 120 may snap-fit onto the respective wedge blocks 110a, 110b without the top surfaces 118 being present. In other words, there is no requirement that the wedge blocks 110a, 110b have a top surface 118 in addition to the caps 120. However, the top surfaces 118 do help provide stability to the both the caps 120 and the underlying wedge blocks 110a, 110b while supporting a pipe 200.

As noted, the pipe support system 100 additionally includes at least one threaded bar 130. In the arrangement of FIGS. 1A and 1B, a pair of threaded bars 130 is employed. Each threaded bar 130 comprises opposing threaded ends 132. In one aspect, each bar 130 is a so-called all-thread.

FIGS. 1A and 1B show:
at least one threaded bar 130 configured to extend through the aligned through-openings 115 in each of the first wedge block 110a and the second wedge block 110b such that a rotation of the at least one threaded bar 130 (which includes a relative rotation with nuts 135) in a first direction will draw the first 110a and second 110b wedge blocks inwardly towards each other while a rotation of the at least one threaded bar 130 in a second direction opposite the first direction will allow the first 110a and second 110b wedge blocks to be moved outwardly from each other.

The threaded ends 132 are configured to receive a nut 135. Each nut 135 may be tightened down against the outside wall 116 of the wedge blocks 110a, 110b in order to adjust the spacing. In addition, a second nut 135 may be placed along each threaded bar 130 to abut an inside wall 114. Such a second nut 135 is depicted in the end view of FIG. 2, discussed below.

The operator may rotate the threaded bars 130 (relative to the nuts 135 or, alternatively, relative to threads 115' in the through-openings 115) in a first direction in order to draw the wedge blocks 110a, 110b inwardly, or rotate the threaded bars 130 the opposite direction to move the wedge blocks 110a, 110b outwardly. It is understood here that the term "rotate" includes relative rotation such as rotating the nuts 135 to provide part of the spacing adjustments. Ideally, the rotation of the two bars 130 occurs simultaneously.

It is also understood that the pipe support system 100 will operate well with one threaded bar 130 or with three threaded bars 130, as opposed to the two bars 130 shown. Of course, if only one threaded bar 130 is used, the bar 130 will ideally be positioned central to the respective wedge blocks 110a, 110b as opposed to being positioned closer to ends 112. Thus, the phrase "one or more threaded bars" in the claims will be well understood.

FIG. 2 is a side view of the pipe support system 100 of FIG. 1A. In this view, a pipe 200 has been set upon the two opposing wedge blocks 110a, 110b. The pipe 200, of course, defines an elongated cylindrical body having a bore 205 that transports fluids. The wedge blocks 110a, 110b are spaced apart in order to accommodate the outer diameter of the pipe 200. In operation, the closer the blocks 110a, 110b get to each other, the higher the pipe 200 rises above the ground surface or above a supporting base plate 140.

It is understood that the present inventions are not limited by the type of pipe employed. The pipe 200 may be part of a pipeline used to convey fluids such as produced water, crude oil, brine, potable water, sewage or hydrocarbon gases. Produced hydrocarbons may be transported from the field into a gathering facility, a treatment facility or a refinery using the pipe 200. Processed fluids may be transported from a treatment facility or a refinery using the pipe 200.

In any instance, the pipe support system 100 may also include an optional base plate 140. In the arrangement of FIGS. 1A, 1B and 2, the base plate 140 represents a rectangular plate. Preferably, the plate 140 is fabricated from steel although it could also be a concrete pad or other sturdy foundational material. Optionally, the base plate 140 may be secured to a concrete structure using anchors (not shown).

The plate 140 includes opposing edges 142. The edges 142 are linear and are parallel to one another. The wedge blocks 110a, 110b and supported pipe 200 are configured to rest on the base plate 140. Of interest, a recessed area 117 is preserved in the middle of the wedge blocks 110. The recessed areas 117 allow the wedge blocks 110a, 110b to each straddle the base plate 140. This stabilizes the wedge blocks 110a, 110b, preventing them from shifting, that is, moving forward or backward, during thermal expansion that takes place within the pipe 200. The result is that the corrugated caps 120 end up serving as wear plates.

To enable the wedge blocks 110a, 110b to straddle the base plate 140, the end walls 112 are configured to have feet 111. The feet 111 frictionally reside along the respective edges 142 of the base plate 140. The feet 111 secure the wedge blocks 110a, 110b as they are moved inwardly or outwardly. Such movement may be applied, for example, in connection with the servicing of the wedge blocks 110a, 110b, including the inspection and replacement of worn caps 120.

FIG. 3A is a front view of a wedge block 310A as may be used in connection with the pipe support system 100 of FIGS. 1A and 1B. The wedge block 310A includes opposing end walls 312A. An inside wall 314 and an outside wall (not visible) make up the base. Through-openings 115 are also shown. Optionally, the through-openings 115 include threads for receiving the threaded bar 130.

The wedge block 310A of FIG. 3A is intended to represent a solid block of material, subject of course to the aligned through-openings 115 which accommodate the threaded bars 130. The aligned through-openings 115 in this instance form channels through the solid block of material. The wedge block 310A is also presented without the angled, removable cap 120. Thus, an angled upper surface 318 is shown.

FIG. 3B is another front view of a wedge block 310B. In this instance, the wedge block 310B is in accordance with the two wedge blocks 110a, 110b of FIGS. 1A and 1B. In this embodiment, a corrugated cap 120 is placed on the wedge block 310B. Channels 125 along the corrugated cap 120 facilitate the movement of water or moisture away from the pipe 200. Note that the corrugations are oriented transverse to a major axis of the cap 120. The wedge block 310B includes opposing end walls 312B.

FIG. 4A is an end view of the wedge block 110B of FIG. 1B, in one embodiment. FIG. 4B is a cross-sectional view of the wedge block 110B of FIG. 1B. From these figures it is observed that the corrugated cap 120 has a lower end 124 and an upper end 126. The lower end 124 wraps around the top of the inside wall 114 while the upper end 126 wraps around the top of the outside wall 116.

FIG. 4C is an enlarged view of portion "C" of FIG. 4B. This shows an interlocking relation between the corrugated cap 120 and the wall 114 of the wedge block 110*b*. The lower end 124 of the cap 120 includes an inwardly facing lip 113. The lip 113 is dimensioned to releasably lock into a notch 313 placed along the inside wall (or "front") 114 of the wedge block 110*b*. The configuration of the lower 124 and upper 126 ends along with the notch 313 allow the corrugated cap 120 to snap-lock into place on the walls 114, 116.

It is noted that over time the corrugated cap 120 and its channels 125 will experience wear. This is due to a combination of weathering and friction. The friction comes from movement of the pipe 200 due to thermal expansion and contraction. In the event a corrugated cap 120 needs to be replaced, it can simply be snapped or pried off of the walls 114, 116. If necessary, the cap 120 can just be sacrificed through use of a hammer, and readily replaced at low cost.

Figure 5A:
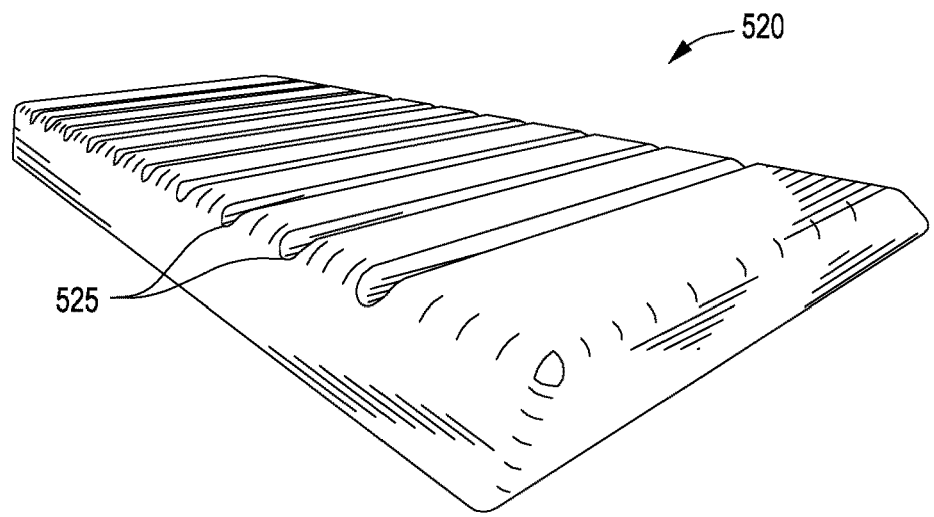
FIG. 5A is a perspective view of the corrugated cap of FIGS. 1B and 3B, in one embodiment.
Figure 5B:
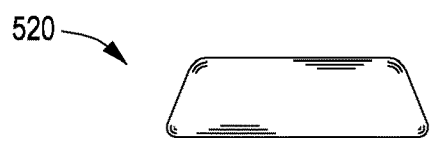
FIG. 5B is an end view of the corrugated cap of FIG. 5A.
Figure 5C:
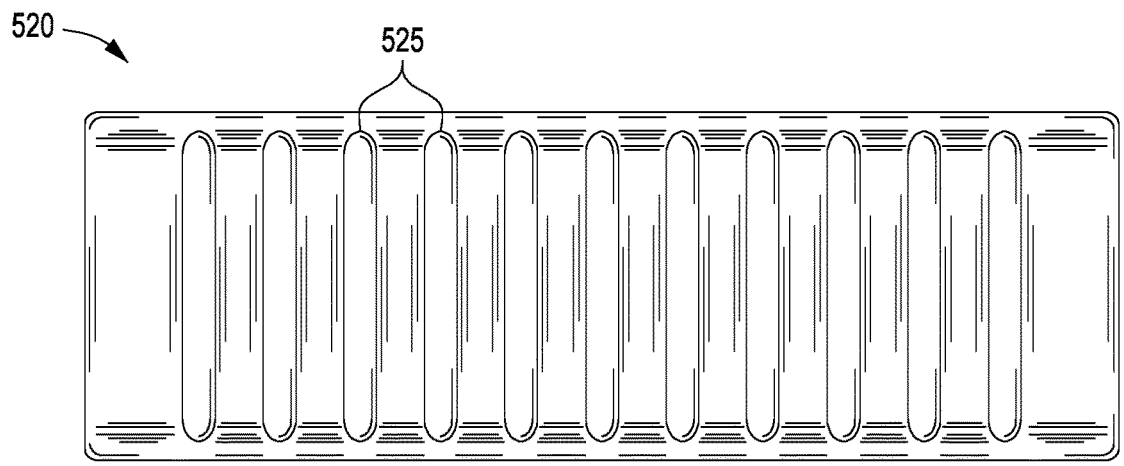
FIG. 5C is a top view of the corrugated cap of FIG. 5A.

FIG. 5A is a perspective view of a corrugated cap 520 as may be used in the pipe support system of FIGS. 1A and 1B. FIG. 5B is an end view of the corrugated cap 520 of FIG. 5A. FIG. 5C is a top view of the corrugated cap 520 of FIG. 5A. In FIGS. 5A through 5C, a plurality of parallel channels 525 are seen.

Figure 6A:
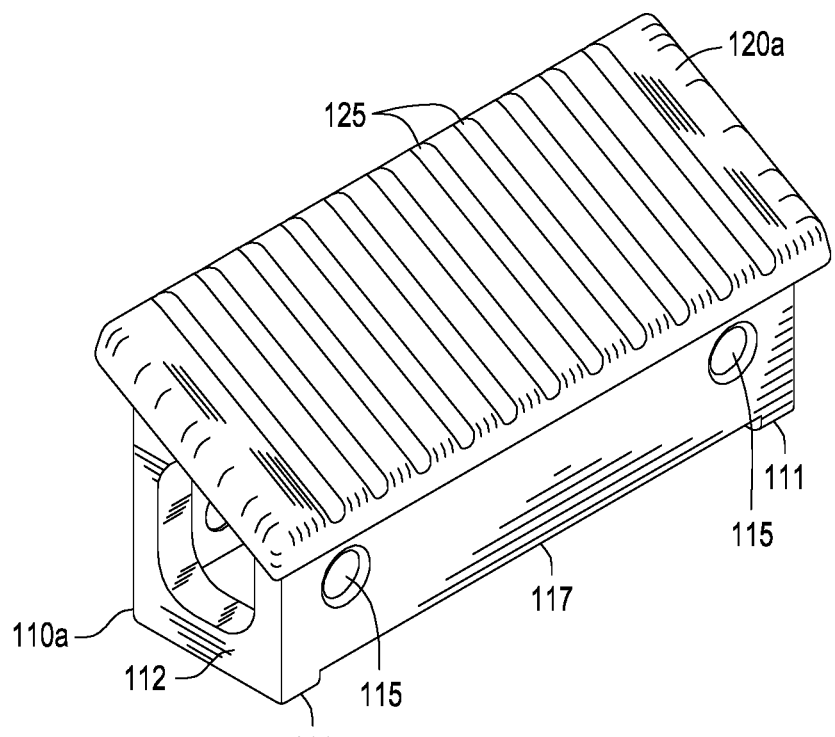
FIG. 6A is a perspective view of a first wedge block and corrugated cap of FIGS. 1A and 1B, seen from a front angle.
Figure 6B:
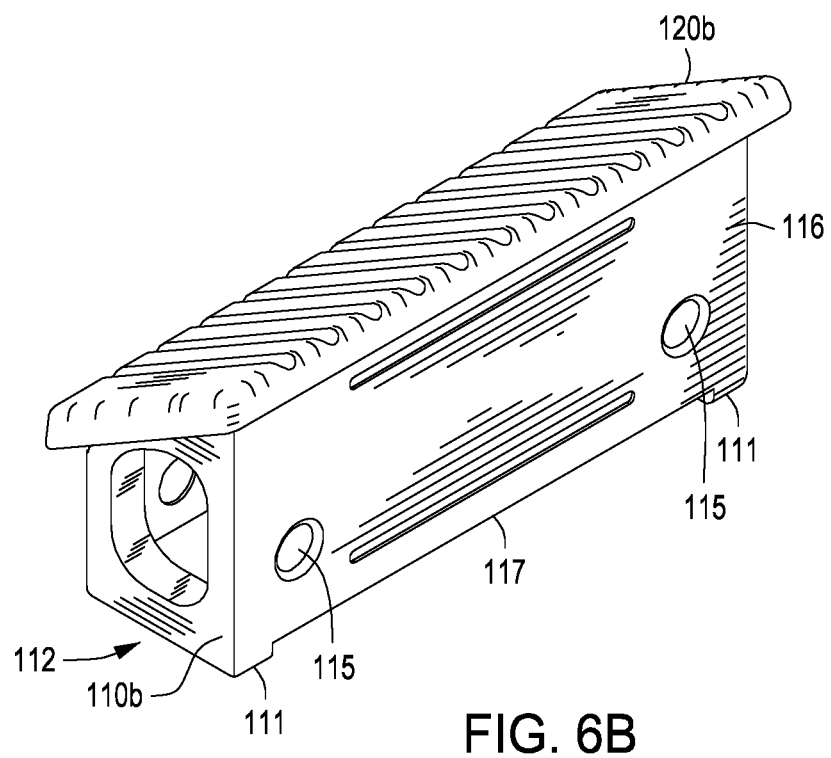
FIG. 6B is a perspective view of a second wedge block and corrugated cap of FIGS. 1A and 1B, seen from a rear angle.

FIG. 6A is a perspective view of a first wedge block 110A and corrugated cap 120A of FIGS. 1A and 1B, seen from a front angle. FIG. 6B is a perspective view of a second wedge block 110*b* and corrugated cap 120*b* of FIGS. 1A and 1B, seen from a rear angle. The first 110A and second 110*b* wedge blocks are designed to face each other in order to receive the pipe 200.

Figure 7:
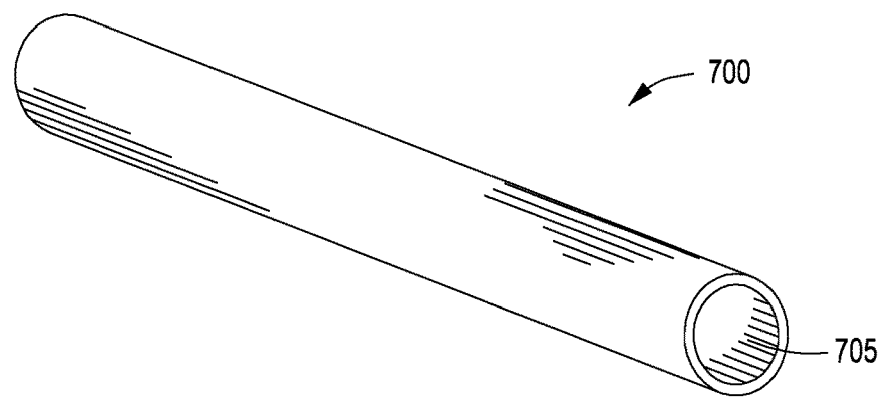
FIG. 7 is a perspective view of a spacer as may be used with the pipe support system of the present invention.

As an additional and optional feature of the pipe support system 100, a spacer may be provided. FIG. 7 is a perspective view of a spacer 700 as may optionally be used with the pipe support system 100 of the present invention. The spacer 700 is a short section of pipe or other tubular body.

The spacer 700 is dimensioned to reside along a threaded bar 130 intermediate the two wedge blocks 110*a*, 110*b*. In this respect, the cylindrical opening (or inner diameter) 705 that extends through the spacer 700 is dimensioned to receive the threaded bar 130. The spacer 700 allows for the user to precisely set the distance between the wedge blocks 110*a*-110*b*, thereby making the support structure 100 appropriately sized for different sized pipes.

In one aspect, the angle of the corrugated caps 120 is between 20° and 40° relative to a surface on which the first wedge block and the second wedge block sit. More preferably, the angle of the caps is at 30°. A mathematical table may be provided to the user, correlating the size of the pipe 200 to the desired spacer 700 length in order to optimize the position of the pipe 200 on the corrugated caps 120, correlated to the angle of the caps 120.

Ideally, the point at which the pipe 200 touches the corrugated caps 120 is a tangent line, meaning that the angle of the tangent line and the angle of the corrugated caps 120 is within a few degrees of each other. The mathematical table will inform the user of the needed spacer length to achieve the tangent line. Of course, if the corrugated caps 120 are designed to have a different angle, then the spacer lengths on the mathematical table will need to be tweaked.

Figure 8:
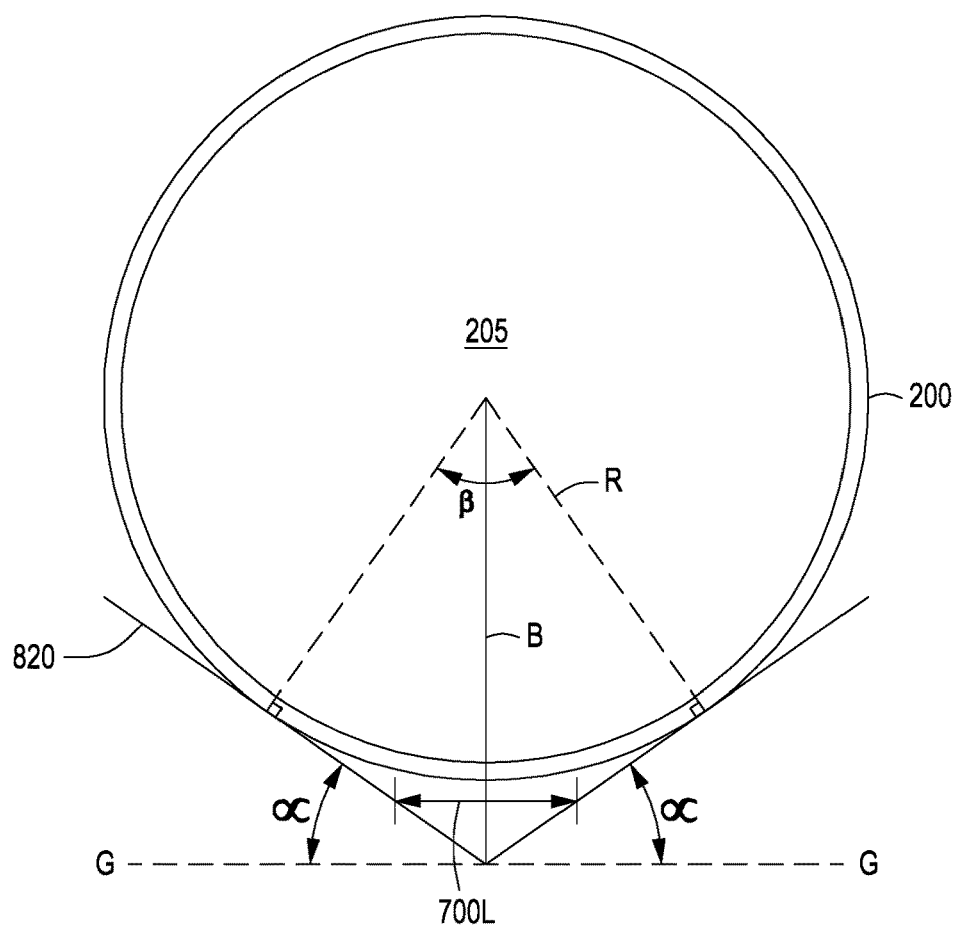
FIG. 8 is a schematic view of a pipe as may be supported by the pipe support system of FIGS. 1A and 1B. Illustrative tangent lines are provided, intended to represent possible configurations of angled caps.

FIG. 8 is a presentation of a pipe 200 having a radius "R." Two radii lines "R" are indicated. In addition, a pair of tangent lines 820 is shown. The tangent lines 820 correspond to locations and angles of the corrugated caps 120, in one embodiment. An angle ß is provided to show a separation of the two radii "R" lines.

An additional line "B" is provided. Line B is a vertical line which bisects angle ß. Further, a horizontal line 700L is provided, connecting tangent lines 820 and also bisected by line B. Mathematically, line 700L depicts a length of spacer 700. Thus, for a pipe 200 having radius "R", the operator would select a spacer 700 having length 700L.

FIG. 8 also depicts line G-G, in dashed form. Line G-G is an imaginary horizontal line drawn at the point where the two tangent lines 820 would, in theory, intersect if the corrugated caps 120 were of sufficient length. The angles γ formed between lines 820 and line G-G are each ½ of angle ß.

Using the pipe support system 100 described above, a method of supporting a section of pipe is also provided herein. In one embodiment, the method first comprises providing a pipe support system. The pipe support system may be in accordance with the pipe support system 100 described above in its various embodiments. For example, the pipe support system may include:

a first wedge block and a second wedge block, wherein each of the first and second wedge blocks comprises a base and an angled top surface, with the angled top surfaces facing one another at least one through-opening through each of the first and second wedge blocks, wherein the respective through-openings are aligned, and at least one threaded bar configured to extend through aligned through-openings in each of the first wedge block and the second wedge block.

The method also includes determining a spacing between the first wedge block and the second wedge block in order to support a joint or section of pipe having an outer diameter. The method then includes rotating each of the threaded bars in order to provide for the determined spacing. It is understood that for purposes of the claims, the term "rotating each of the threaded bars" includes relative rotation, such as rotating a nut secured to a threaded bar in order to tighten down the wedge blocks against the spacer bar.

In a preferred arrangement, each of the threaded bars may be rotated in a first direction to draw the first and second wedge blocks inward towards each other. Reciprocally, each of the threaded bars may be rotated in a second opposite direction to allow the first and second wedge blocks to be moved outward from each other.

The method further comprises placing the joint or section of pipe onto the pipe support system. In this way the pipe is supported above a ground surface.

In one embodiment, the method also includes securing a separate bearing plate onto each of the wedge blocks. Each of the bearing plates is a frangible cap, such as nylon, residing on the angled top surface of the first and second wedge blocks, respectively. Each of the caps comprises corrugations or channels dimensioned to gravitationally wick away water to prevent water from building up along the outer diameter of the pipe.

Each of the corrugated caps comprises:

a first side configured to land on a top of an outside wall of a base of a wedge block;

a shoulder along the first side configured to wrap over the top of the outside wall of the wedge block;

a second side configured to land on a top of an inside wall of the base of the wedge block; and a shoulder along the second side configured to wrap over the top of the inside wall of the wedge block.

An outer surface of the inside wall comprises a notch. At the same time, the shoulder along the second side comprises a lip that is dimensioned to snap-lock into the notch. Securing a bearing plate comprises snapping the bearing plate onto the base that forms the respective wedge block.

The method may further comprise replacing each of the corrugated caps after a period of wear. Replacing may mean unsnapping the bearing plate off of the base before snap-locking a new bearing plate onto the base. Alternatively, replacing may mean breaking the bearing plate, such as through hammering before snap-locking a new bearing plate onto the base. Thus, the corrugated cap is a sacrificial element as a result of use.

Finally, a method of replacing a bearing plate for a pipe support structure is provided herein. In one aspect, the method first comprises providing a pipe support system. The pipe support system is structure in accordance with the pipe support system 100 described above in its various embodiments. This includes a first wedge block and a second wedge block, wherein each of the first and second wedge blocks comprises a base.

The method also includes installing a bearing plate onto each of the first and second wedge blocks. This is done through a snap-lock fit. Each of the bearing plates comprises corrugations dimensioned to gravitationally wick away water to prevent water from building up along the outer diameter of pipe. In addition, each of the bearing plates resides at an angle of between 20° and 40° over the respective wedge blocks, wherein the angles are inwardly-facing.

Additionally, the method comprises determining a spacing between the first wedge block and the second wedge block. This is done in order to support a joint or section of pipe having an outer diameter. The method then includes placing the joint or section of pipe onto the pipe support system, thereby supporting the pipe above a ground surface.

After a period of time the bearing plates will experience wear. The method then includes removing the bearing plates from the respective wedge blocks. Then, again using a snap-lock fit, the method includes installing a replacement bearing plate onto each of the first and second wedge blocks. Each of the replacement bearing plates also comprises corrugations dimensioned to gravitationally wick away water to prevent water from building up along the outer diameter of pipe. In addition, each of the replacement bearing plates also resides at an angle of between 20° and 40° over the respective wedge blocks.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application.

In the claims which follow, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

I claim:

1. A pipe support system, comprising:
   a first wedge block and a second wedge block, wherein each of the first and second wedge blocks comprises:
      a base having an inside wall, an outside wall, and opposing end walls, wherein:
         the base has a polygonal profile,
         the outside wall is taller than the inside wall, and
         the opposing end walls serve as feet;
      a first through-opening through the inside wall proximate a first end of the base;
      a first through-opening through the outside wall proximate the first end of the base;
      a second through-opening through the inside wall proximate a second end of the base;
      a second through-opening through the outside wall proximate the second end of the base;
      wherein:
         the first through-openings through the inside wall and the outside wall of the first wedge block are aligned with the first through-openings through the inside wall and the outside wall of the second wedge block, forming first aligned through-openings; and
         the second through-openings through the inside wall and the outside wall of the first wedge block are aligned with the second through-openings through the inside wall and the outside wall of the second wedge block, forming second aligned through-openings;
   a first threaded bar extending through the first aligned through-openings;
   a second threaded bar extending through the second aligned through-openings;
      wherein the first and second threaded bars reside in a parallel and spaced-apart relationship, and with the pipe support system configured such that a rotation of each of the first and second threaded bars in a first direction will draw the first and second wedge blocks inwardly towards each other, while a rotation of each of the first and second threaded bars in a second direction opposite the first direction will cause the first and second wedge blocks to be moved outwardly away from each other;
   a first cap residing on the base of the first wedge block; and
   a second cap residing on the base of the second wedge block;
      and wherein:
         the first and second caps are angled inwardly towards one another and are configured to support a section of pipe;
         each of the first and second caps resides at an angle of between 20° and 40° relative to a surface on which the first and second wedge blocks sit;
         each of the first and second caps comprises channels dimensioned to gravitationally wick away water, forming corrugations to prevent water from building up along an outer diameter of the section of pipe; and
         each of the first and second caps is configured to engage a respective one of the first and second wedge blocks through a snap-fit connection, providing a removable bearing surface for the section of pipe.

2. The pipe support system of claim 1, further comprising:
   an angled top surface above the base of the first wedge block; and
   an angled top surface above the base of the second wedge block;
   and wherein:
      the first cap resides over the angled top surface of the first wedge block, and
      the second cap resides over the angled top surface of the second wedge block.

3. The pipe support system of claim 1, wherein each of the first and second caps comprises:
a first side configured to land on a top of the outside wall of the respective one of the first and second wedge blocks;
a shoulder along the first side configured to wrap over the top of the outside wall of the respective one of the first and second wedge blocks;
a second side configured to land on a top of the inside wall of the respective one of the first and second wedge blocks; and
a shoulder along the second side configured to wrap over the top of the inside wall of the respective one of the first and second blocks.

4. The pipe support system of claim 3, wherein:
an outer surface of the inside wall of each of the first and second wedge blocks comprises a notch; and
the shoulder along the second side of each of the first and second caps comprises a lip that is dimensioned to snap-lock into the notch of the outer surface of the inside wall of the respective one of the first and second wedge blocks, providing the snap-fit connection and permitting the respective one of the first and second caps to be replaced after a period of wear.

5. The pipe support system of claim 3, wherein:
the pipe support system further comprises a base plate, defining the surface on which the first and second wedge blocks sit;
the base plate has opposing parallel edges;
the feet of each of the first and second wedge blocks are configured to straddle the opposing parallel edges of the base plate, thereby laterally securing the first and second wedge blocks as the first and second wedge blocks are moved inwardly or outwardly in response to the rotation of each of the first and second threaded bars in the first direction or in the second direction.

6. The pipe support system of claim 5, further comprising:
a first nut threadedly secured onto the first threaded bar; and
a second nut threadedly secured onto the second threaded bar;
and wherein each of the first and second nuts is configured to be rotated along a respective one of the first and second threaded bars to engage a respective one of the first and second wedge blocks.

7. The pipe support system of claim 6, wherein:
each of the first and second nuts is configured to be positioned to abut an outer surface of the outside wall of the respective one of the first and second wedge blocks to limit relative outward movement of the respective one of the first and second wedge blocks, and such that the rotation of each of the first and second threaded bars in the first direction will move the first and second wedge blocks inwardly towards each other.

8. The pipe support system of claim 6, wherein:
each of the first and second nuts is configured to be positioned to abut an outer surface of the inside wall of the respective one of the first and second wedge blocks to limit relative inward movement of the first and second wedge blocks, and such that the rotation of each of the first and second threaded bars in the second direction will move the first and second wedge blocks outwardly away from each other.

9. The pipe support system of claim 1, wherein:
each of the first and second caps is fabricated from a non-conductive material; and
the channels of each of the first and second caps are oriented transverse to a major axis of the respective cap.

10. The pipe support system of claim 9, wherein:
the base of each of the first and second wedge blocks has a substantially hollow interior;
each of the first and second wedge blocks is fabricated from a non-conductive material; and
each of the first and second caps is fabricated from nylon.

11. The pipe support system of claim 1, wherein:
the base of each of the first and second wedge blocks defines a solid block of material;
the solid block of material defined by the base of the first wedge block includes elongated channels that define the first through-openings through the inside wall and the outside wall of the first wedge block and the second through-openings through the inside wall and the outside wall of the first wedge block;
the solid block of material defined by the base of the second wedge block includes elongated channels that define the first through-openings through the inside wall and the outside wall of the second wedge block and the second through-openings through the inside wall and the outside wall of the second wedge block; and
each of the elongated channels of each of the first and second wedge blocks is dimensioned to receive a respective one of the first and second threaded bars.

12. The pipe support system of claim 1, further comprising:
a first tubular spacer residing around the first threaded bar intermediate the first and second wedge blocks; and
a second tubular spacer residing around the second threaded bar intermediate the first and second wedge blocks;
and wherein each of the first and second tubular spacers is dimensioned to hold the first and second wedge blocks a predetermined distance apart.

13. The pipe support system of claim 1, wherein:
the first through-opening through the outside wall of each of the first and second wedge blocks and the second through-opening through the outside wall of each of the first and second wedge blocks comprise threads configured to threadedly receive the first and second threaded bars.

14. A method of supporting a section of pipe, comprising:
providing a pipe support system, the pipe support system comprising:
a first wedge block and a second wedge block, each of the first and second wedge blocks including:
an inside wall,
an outside wall, with the outside wall being taller than the inside wall,
a top surface extending from the outside wall to the inside wall, and
a pair of through-openings;
a first removable cap residing over the top surface of the first wedge block, and a second removable cap residing over the top surface of the second wedge block,
and wherein:
each of the first and second removable caps provides a bearing surface for the section of pipe,
each of the first and second removable caps comprises channels dimensioned to gravitationally wick away water to prevent water from building up along an outer diameter of the section of pipe, the top surfaces of the first and second wedge blocks are angled inwardly towards each other, a first through-opening of the pair of through-openings of the first wedge block is aligned with a first through-opening of the pair of through-openings of the second wedge block, forming first aligned through-openings, and a second through-opening of the pair of through-openings of the first wedge block is aligned with a second through-opening of the pair of through-openings of the second wedge block, forming first and second aligned through-openings;

a first threaded bar extending through the first aligned through-openings; and a second threaded bar extending through the second aligned through-openings;

determining a spacing between the first wedge block and the second wedge block in order to support the section of pipe;

rotating each of the first and second threaded bars in order to provide for the determined spacing, wherein a rotation of each of the first and second threaded bars in a first direction will draw the first and second wedge blocks inward towards each other, while a rotation of each of the first and second threaded bars in a second direction opposite the first direction will move the first and second wedge blocks outward away from each other; and placing the section of pipe onto the first and second removable caps, thereby supporting the section of pipe above a ground surface.

15. The method of claim 14, wherein the pipe support system further comprises:
a first nut threadedly secured onto an end of the first threaded bar;
a second nut threadedly secured onto an end of the second threaded bar;
and wherein the method further comprises rotating the first nut relative to the first threaded bar in order to engage the first nut with a respective one of the first and second wedge blocks, and rotating the second nut relative to the second threaded bar in order to engage the second nut with a respective one of the first and second wedge blocks.

16. The method of claim 14, wherein:
each through-opening of the first and second aligned through-openings comprises threads configured to threadedly receive a respective one of the first and second threaded bars.

17. The method of claim 14, wherein:
the pipe support system further comprises a base plate configured to support the first and second wedge blocks; and
the top surface of each of the first and second wedge blocks is at an angle of between 20° and 40° relative to the base plate.

18. The method of claim 17, wherein:
the base plate has opposing parallel edges; and
each of the first and second wedge blocks comprises a first end and a second end opposite the first end;

and wherein the method further comprises placing each of the first and second wedge blocks onto the base plate such that the first and second ends of each of the first and second wedge blocks straddle the opposing parallel edges of the base plate, thereby laterally securing the first and second wedge blocks as the first and second wedge blocks are moved inwardly or outwardly in response to the rotation of each of the first and second threaded bars in the first direction or in the second direction.

19. The method of claim 18, wherein the pipe support system further comprises:
a first nut threadedly secured onto an end of the first threaded bar; and
a second nut threadedly secured onto an end of the second threaded bar;
and wherein the method further comprises rotating the first nut along the first threaded bar and the second nut along the second threaded bar in order to engage each of the first and second nuts against a respective one of the first and second wedge blocks.

20. The method of claim 18, wherein each of the first and second removable caps is fabricated from a non-conductive material.

21. The method of claim 18, further comprising:
determining an optimum spacing between the first and second wedge blocks based upon (i) the angle of the top surface of each of the first and second wedge blocks relative to the base plate, and (ii) the outer diameter of the section of pipe.

22. The method of claim 21, further comprising:
placing a first tubular spacer around the first threaded bar intermediate the first and second wedge blocks; and
placing a second tubular spacer around the second threaded bar intermediate the first and second wedge blocks;
and wherein each of the first and second tubular spacers is dimensioned to hold the first and second wedge blocks a selected distance apart in accordance with the optimum spacing.

23. The method of claim 14, wherein each of the first and second removable caps comprises:
a first side configured to land on a top of the outside wall of a respective one of the first and second wedge blocks;
a shoulder along the first side configured to wrap over the top of the outside wall of the respective one of the first and second wedge blocks;
a second side configured to land on a top of the inside wall of the respective one of the first and second wedge blocks; and
a shoulder along the second side configured to wrap over the top of the inside wall of the respective one of the first and second blocks;
and wherein:
an outer surface of the inside wall of each of the first and second wedge blocks comprises a notch; and
the shoulder along the second side of each of the first and second removable caps comprises a lip that is dimensioned to snap-lock into the notch of the respective one of the first and second wedge blocks.

24. The method of claim 14, further comprising:
replacing each of the first and second removable caps after a period of wear.

* * * * *